No. 643,896. Patented Feb. 20, 1900.
P. GOLDSMITH.
TOE CLIP AND COUNTERPOISE.
(Application filed Oct. 9, 1897.)
(No Model.) 2 Sheets—Sheet 1.
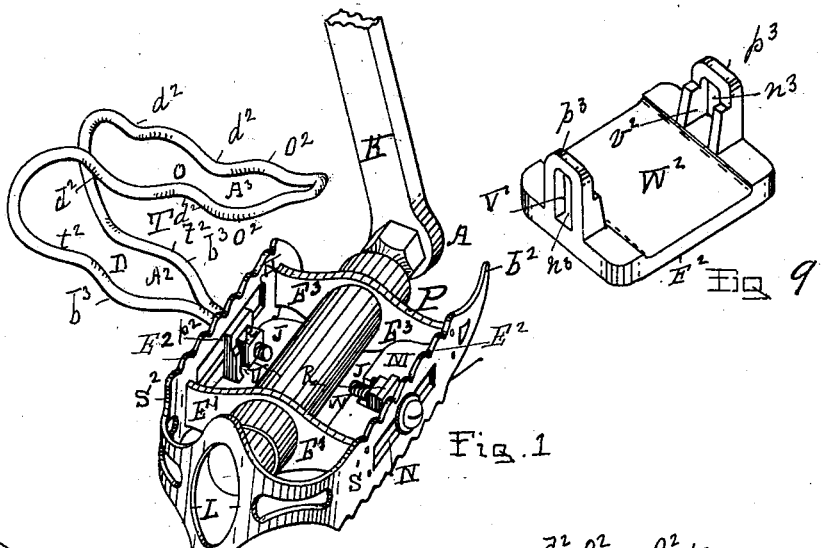
Fig. 1.
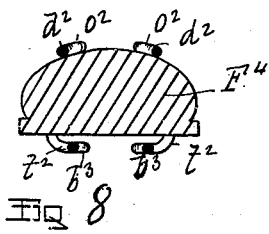
Fig. 9.
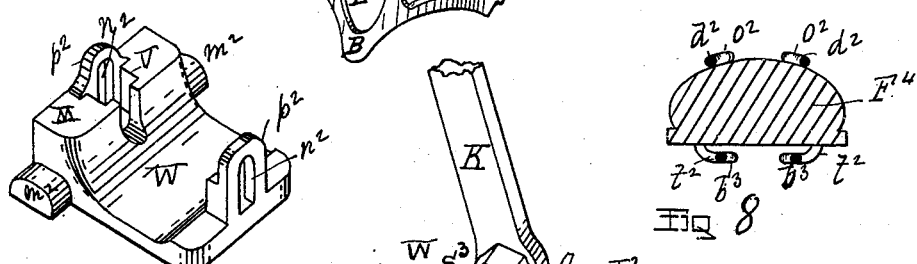
Fig. 3.
Fig. 8.
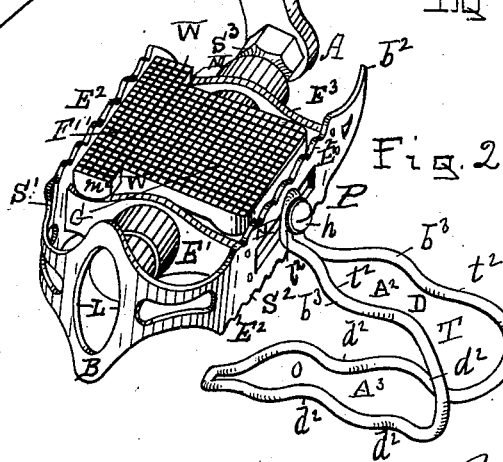
Fig. 2.
WITNESSES
William A. Swert
J. B. Karp.
INVENTOR
Paul Goldsmith
by W. E. Hagan his
atty No. 643,896. Patented Feb. 20, 1900.
P. GOLDSMITH.
TOE CLIP AND COUNTERPOISE.
(Application filed Oct. 9, 1897.)
(No Model.) 2 Sheets—Sheet 2.
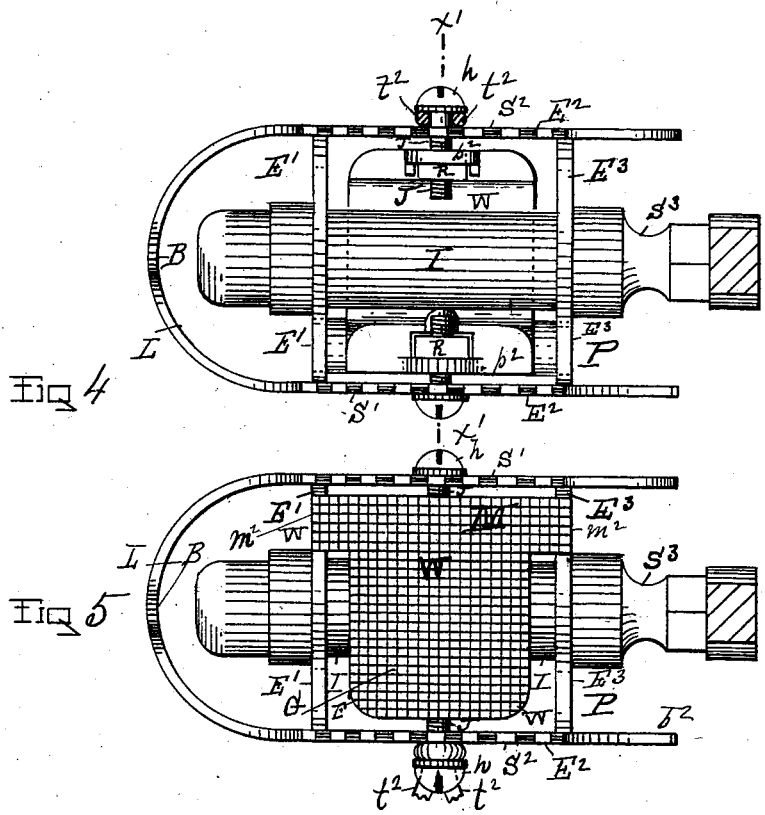
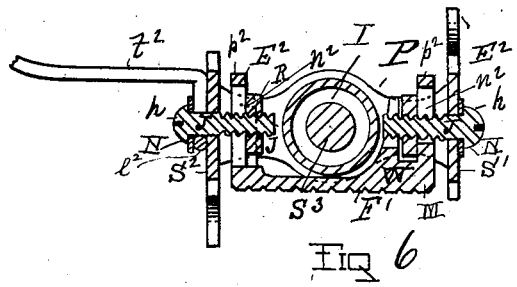
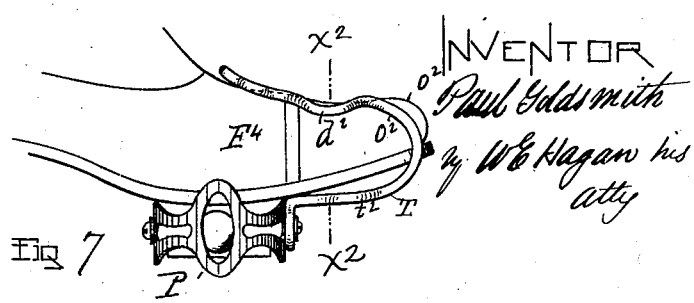
WITNESSES
William A. Sweet
INVENTOR
Paul Goldsmith
by W E Hagan his atty

UNITED STATES PATENT OFFICE.

PAUL GOLDSMITH, OF TROY, NEW YORK.

TOE-CLIP AND COUNTERPOISE.

SPECIFICATION forming part of Letters Patent No. 643,896, dated February 20, 1900.

Application filed October 9, 1897. Serial No. 654,667. (No model.)

*To all whom it may concern:*

Be it known that I, PAUL GOLDSMITH, of the city of Troy, county of Rensselaer, and State of New York, have invented new and useful Improvements in Toe-Clips and Counterpoise Attachments to Bicycle-Pedals, of which the following is a specification.

My invention relates to improvements in counterpoise attachments to bicycle-pedals and also to the form of the toe-clips used in connection with the latter, it being the object of my invention to adapt the overhang of the toe-clips of bicycle-pedals (through an improved construction) to engage with the rounded upper surface of the rider's feet with an inclosing grasp when the latter are entered upon the tread within the clip; and my invention also has for its object the adaptation for use of either of the tread-faces of the counterpoised pedals when the rider is mounting. In the older forms of counterpoise attachments to bicycle-pedals the rider's feet cannot be applied to that one of the pedal-treads from which the counterpoise depends or from which it projects, and as the pedals are revolving rapidly, as they are apt to do when the bicycle is started for the rider to mount, but one of the tread-faces of each pedal can be used. By my improvement either of the tread-faces of each of the counterpoised pedals can be used when mounting, and as the rider is seated and is moving the position of the feet may be changed, if not already in engagement with the toe-clip tread-face of the pedals, by the position which the latter will assume through the action of the counterpoise when the rider's foot is temporarily removed.

Accompanying this specification to form a part of it there are two plates of drawings containing nine figures illustrating my invention, with the same designation of parts by letter reference used in all of them.

Of the illustrations, Figure 1 is a perspective of a bicycle-pedal containing my improvements with what is the toe-clip tread-face of the pedal shown as facing the view. Fig. 2 is another perspective of the pedal that is shown at Fig. 1, but illustrated in Fig. 2 with its counterpoise tread-face as uppermost. Fig. 3 is a perspective of the counterpoise shown as detached from the pedal. Fig. 4 is a top view of the pedal with its toe-clip tread-face shown as uppermost and with the sides of the toe-clip shown in transverse section. Fig. 5 is a plan view of the pedal with its tread-face which is on the pedal side opposite to that on which the toe-clip is placed shown as uppermost. Fig. 6 is a section taken on the line $x'\,x'$ of Fig. 4. Fig. 7 is a side elevation of my improved toe-clip and the pedal to which it is attached, with the toe-clip sides shown as grasping the rounded upper surface of the rider's foot at its toe end. Fig. 8 is a section taken on the line $x^2\,x^2$ of Fig. 7, and Fig. 9 is a modification of the counterpoise shown in perspective and as detached from the pedal.

The several parts of the apparatus thus illustrated are designated by letter reference and the function of the parts is described as follows:

The letters P designate the pedals; $S'$ and $S^2$, the pedal sides, each having the serrated top and bottom edges $E^2$, and the letters $E'$ and $E^3$ designate the pedal ends. The letters I designate the pedal-sleeve, which is connected to the ends $E'$ and $E^3$, in which sleeve the shaft $S^3$ of the pedal journals, and the letter K designates the crank-arm, which latter at its outer end A connects with the pedal-shaft $S^3$. The letters L designate end extensions of the pedal sides, which, as projected beyond the ends proper, $E'$ and $E^3$, are curved inwardly to meet and produce upon each of their edges the vertically-projected foot-stops B, and the letters $b^2$ designate a foot-stop projected from the inner end and outer edge of each of the pedal sides $S'$ and $S^2$, all of which parts are of the usual form and construction, and which, apart from their coöperating combination with my improvements, are hereby disclaimed.

The letters T designate my improved toe-clip, which is made of wire to have the loop end $l^2$ for attachment to one of the pedal sides, as will be hereinafter detailed, and from where producing this loop the wire forming the two sides $t^2\,t^2$ of the clip-tread D is extended outwardly and laterally from the loop on an angle $A^2$ and from where thus forming the sides of the clip-tread D the wires forming the sides of the latter are bent upwardly and laterally on an angle $A^3$ to form the overhang O, the sides O² O² of the latter being provided with the bends $d^2$ $d^2$, with the sides O² meeting at the apex of the angle A³. The tread sides of the toe-clip are provided with bends $b^3$, in which the wire is extended laterally in the same plane as the remaining parts of the tread sides. The bends $d^2$ curve downwardly and outwardly, so as to concavely engage with the contour of the rider's feet F⁴ and thus between the two sides of the overhang to form a grasping contact with the feet to prevent them from sliding laterally on the tread of the clip. While these bends $d^2$ perform these functions, they also coöperate with the bends $b^3$ to stiffen the clip, and thus permit the use of lighter wire than would be required were the bends omitted.

It will be seen that the toe-clip is formed of wire bent to fit over the rider's toes and forms two parallel undulating rods connected at the ends only and having a V shape both above and below the foot, so as to be self-adjustable or adaptable to the shape and size of the foot and the degree of strain in lifting—for example, when a hill is ascended. If these wire rods were twisted together or otherwise connected at any point between their two ends, they would so stiffen each other as to greatly lessen the facility of expansion and contraction and also to impede the perfect fitting of the upper part of the clip to the top of the rider's foot about the base of the toes.

The letters W designate the counterpoise, which consists of a rectangular weight, which is adapted to connect adjustably with the interior face of the pedal sides beneath the pedal-sleeve I, and which counterpoise has a thicker portion M upon one of its sides and also projections $m^2$ on that corner edge of the counterpoise which is beneath the weighted portion M. This counterpoise adjustably connects with the pedal sides S' and S² by means of a slot N, formed in each of the latter, a screw-bolt J, having a head $h$, adapted to straddle and engage exteriorly with the sides of the slot N in each of the pedal sides and passing through that one of the slots $n^2$ formed in the next adjacent one of the projections $p^2$, upcast from each side of the counterpoise W, and a nut R on the inner end of each of the screw-bolts J, said nuts each being arranged in a vertical recess V, formed in the inner face of each of the projections $p^2$, where said nuts can each straddle the sides of one of the slots $n^2$ and be kept from turning by the recess V. As thus constructed the counterpoise W is adapted to be moved laterally from the pedal side S' toward the pedal side S² to reduce the counterbalancing effect of the weighted side M, with the reverse movement of the counterpoise operating to increase the measure of balancing power produced by the weighted side M of the counterpoise W, and in either condition of their adjustment the parts will be firmly held in place as adjusted.

As shown at Figs. 1, 2, and 5, my counterpoise is constructed with the weighted side M to be used in connection with a toe-clip. In the modification shown at Fig. 9 the counterpoise is adapted to be used without a toe-clip and by its weight as secured to the pedal sides below the sleeve I (on which the pedals journal) to keep the side of the pedal thus weighted down by the counterpoise as undermost and the other tread-face of the pedal uppermost.

In the modification shown at Fig. 9 the counterpoise is designated at W², its upcast projections at each side at $p^3$, the slot formed in each of the latter designated at $n^3$, and the vertical recess formed in the projections designated at V². The counterpoise shown in the modification at Fig. 9 is arranged to connect with the slot formed in each of the pedal sides by means of the slot $n^3$, formed in each of the upcast projections $p^3$, the screw-bolts J, and the nuts R.

The counterpoise W, as well as the modification designated at W², have what is their under surface when the pedal is at rest slightly inside of the serrated edges of the pedal sides, the bottom face of the counterpoise designated at W being indicated at F' and that of the modification W² at F². To better adapt the under surface of these counterpoise attachments to be temporarily used as pedals, they are cross-furrowed, as indicated at G, and, if desired, they may be covered with rubber.

I am aware of the former use of a device having connected frame parts consisting of two vertical sides and a horizontal bottom part connected at right angles to the bottom edges of the vertical sides, with a toe-clip formed on one of the vertical sides and with the other vertical side weighted, with said frame part arranged exteriorly of the pedal sides and made vertically adjustable thereon. This older device differs from that herein described in the fact that the latter has the toe-clip attached to one of the pedal sides exteriorly and with the counterpoise arranged interiorly of the pedal sides and thereat made laterally adjustable toward or from the sleeve in which the pedal-shaft journals.

Having the pedals thus constructed with counterpoise attachments, either face of the pedals can be used as a tread-face when mounting and when the pedals are apt to be revolving on their journals, and after the rider has mounted and is moving, the rider's feet, if using the counterpoise tread-face, can be removed therefrom, when the counterpoise will operate to bring uppermost the other pedal tread-face for the reception of the rider's foot.

Having thus described my invention, what I claim, and desire to secure by Letters Patent, is—

1. A wire toe-clip bent to fit over the rider's toes and forming two undulating rods connected at the ends only and being of V shape both above and below the foot, substantially as set forth.

2. A counterpoise for a bicycle-pedal provided at one side with a raised part M and lateral extensions and having also vertical slots $n^2$ at its opposite sides for attachment to the sides of the pedal, the said counterpoise being arranged within the pedal-frame and against the under side of the said shaft, substantially as set forth.

Signed at the city of Troy, New York, this 6th day of October, 1897, and in the presence of the two witnesses whose names are hereto written.

PAUL GOLDSMITH.

Witnesses:
CHARLES S. BRINTNALL,
W. E. HAGAN.